(12) United States Patent
Krater et al.

(10) Patent No.: US 11,117,232 B2
(45) Date of Patent: Sep. 14, 2021

(54) DOWNDRAFT TABLE HAVING A WORKPIECE HOLDER FOR A WORKPIECE TO BE HELD

(71) Applicant: ESTA APPARATEBAU GMBH & CO. KG, Senden (DE)

(72) Inventors: Sebastian Krater, Senden (DE); Daniel Palmeiro-Rohleder, Ulm (DE)

(73) Assignee: ESTA APPARATEBAU GMBH & CO. KG, Senden (DE)

( * ) Notice: Subject to any disclaimer, the term of this patent is extended or adjusted under 35 U.S.C. 154(b) by 208 days.

(21) Appl. No.: 16/481,974

(22) PCT Filed: May 17, 2017

(86) PCT No.: PCT/DE2017/100422
§ 371 (c)(1),
(2) Date: Jul. 30, 2019

(87) PCT Pub. No.: WO2018/145677
PCT Pub. Date: Aug. 16, 2018

(65) Prior Publication Data
US 2020/0039012 A1    Feb. 6, 2020

(30) Foreign Application Priority Data
Feb. 13, 2017    (DE) .................. 10 2017 102 847.1

(51) Int. Cl.
*B23Q 1/52*    (2006.01)
*B23Q 11/00*    (2006.01)
(Continued)

(52) U.S. Cl.
CPC .............. *B23Q 1/522* (2013.01); *B08B 15/02* (2013.01); *B23Q 11/0046* (2013.01);
(Continued)

(58) Field of Classification Search
CPC . B23Q 11/00; B23Q 11/0042; B23Q 11/0046; B23Q 11/0067; B23Q 11/0075;
(Continued)

(56) References Cited

U.S. PATENT DOCUMENTS 3,941,040 A * 3/1976 Carlson ................. B08B 15/023
454/56
4,632,022 A * 12/1986 Baitinger .............. B08B 15/023
312/209
(Continued)

FOREIGN PATENT DOCUMENTS

CN    205166149    4/2016
CN    106362974    2/2017
(Continued)

OTHER PUBLICATIONS

International Search Report and Written Opinion for corresponding Patent Application No. PCT/DE2017/100422 dated Nov. 14, 2017.
(Continued)

*Primary Examiner* — Tyrone V Hall, Jr.
(74) *Attorney, Agent, or Firm* — Renner, Otto, Boisselle & Sklar, LLP

(57) ABSTRACT

The invention relates to a downdraft table (1) having a workpiece holder (2) for a workpiece to be held, wherein the workpiece holder (2) is configured in a stationary manner, wherein a suction-extraction device (3) is arranged beneath and/or next to the workpiece holder (2), said suction-extraction device (3) being used to discharge particles and/or gases downward in a waste air flow, wherein the suction-extraction device (3) is arranged around the workpiece holder (2) with respect to the latter and is configured to be rotatable about the workpiece holder (2).

10 Claims, 13 Drawing Sheets

Figure 1:
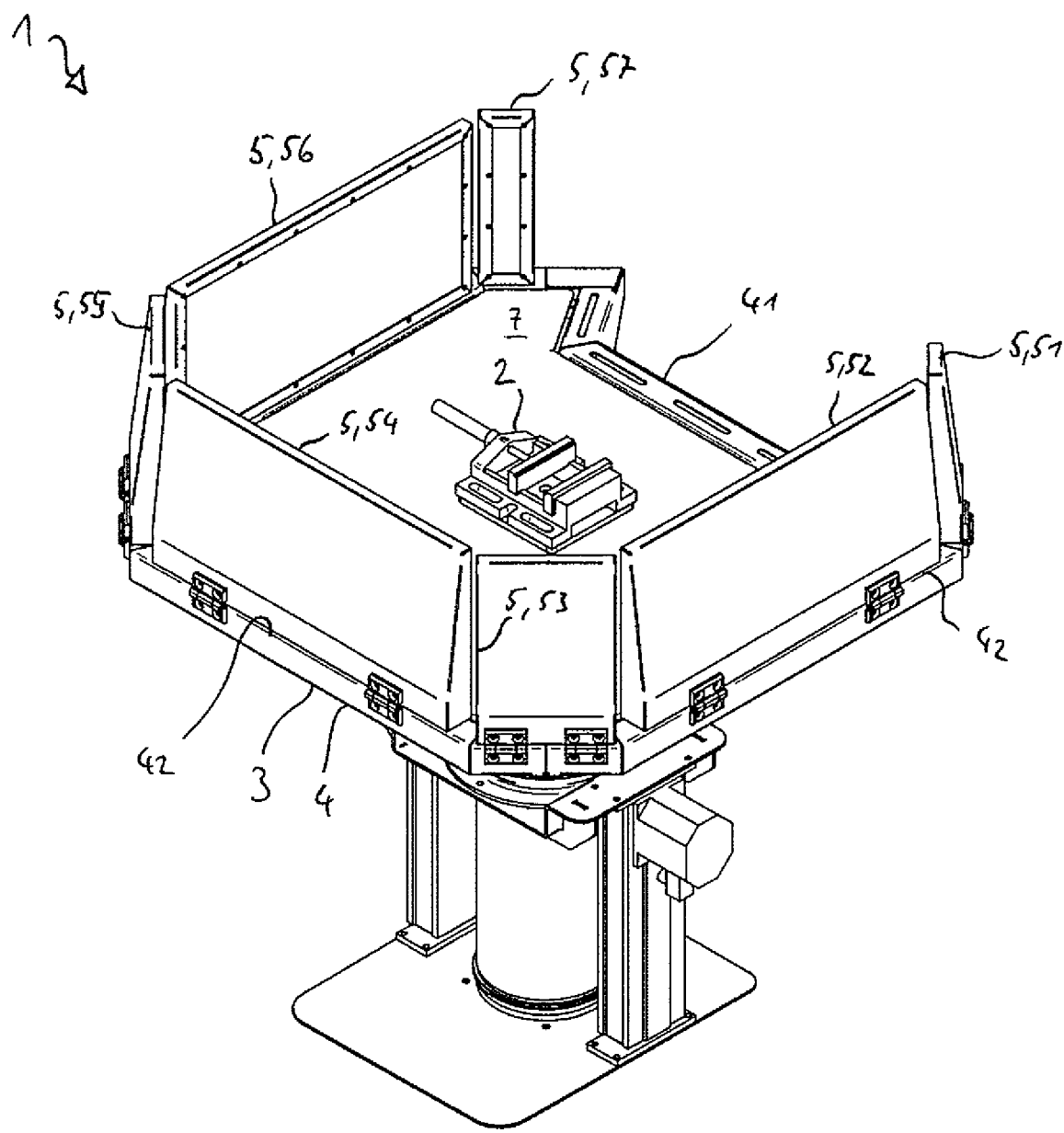

(51) Int. Cl.
  *B23Q 11/08*   (2006.01)
  *B23H 1/02*   (2006.01)
  *B25H 1/16*   (2006.01)
  *B25H 1/20*   (2006.01)
  *B08B 15/02*  (2006.01)
  *B25H 1/02*   (2006.01)

(52) U.S. Cl.
  CPC ........... *B23Q 11/0891* (2013.01); *B25H 1/02* (2013.01); *B25H 1/16* (2013.01); *B25H 1/20* (2013.01); *B23Q 2220/004* (2013.01); *B23Q 2703/02* (2013.01)

(58) Field of Classification Search
  CPC ..... B23Q 11/0891; B08B 15/02; B08B 15/04; B08B 2215/006; B23K 9/325; Y10S 55/46; B25H 1/20
  See application file for complete search history.

(56) References Cited

U.S. PATENT DOCUMENTS

| | | | | |
|---|---|---|---|---|
| 5,056,422 | A * | 10/1991 | Horntvedt | B08B 15/023 454/57 |
| 6,116,249 | A | 9/2000 | Tuffery | |
| 6,811,587 | B1 * | 11/2004 | Lorey | F24F 3/163 55/385.2 |
| 2002/0079069 | A1 * | 6/2002 | Cheng | B23Q 11/0816 160/330 |
| 2015/0361550 | A1 * | 12/2015 | Yabe | C23C 16/45551 438/782 |

FOREIGN PATENT DOCUMENTS

| | | |
|---|---|---|
| DE | 10 2004 008101 A1 | 9/2005 |
| DE | 20 2009 012 300 U1 | 11/2009 |
| DE | 20 2010 002691 U1 | 9/2011 |
| EP | 0 522 098 A1 | 1/1993 |
| WO | WO 92/09402 | 6/1992 |

OTHER PUBLICATIONS

Office Action and its English translation, issued in corresponding Chinese Application No. 201780086158.7, dated Jun. 9, 2021.

* cited by examiner

DOWNDRAFT TABLE HAVING A WORKPIECE HOLDER FOR A WORKPIECE TO BE HELD

The invention relates to a downdraft table with a workpiece holder for a workpiece to be held.

Workpiece holders are normally mounted on work tables. If the work tables are designed as downdraft tables, there is downward, rearward or lateral suction.

These work tables are frequently fixed in the work hall and are therefore not freely movable. The worker clamps his workpiece in the rigid, stationary and immovable workpiece holder and must move into sometimes ergonomically problematic positions while working with the tool or machine (such as an angle grinder). Moreover in certain circumstances, the workpiece needs to be re-clamped several times in order to reach all sides for processing.

An exhaust hood can be used alternatively to a downdraft table; this must also be adapted two hand operation is problematic in this case—in order to enable the arising dust to be captured.

The object of the invention is to create an ergonomic and effective platform for processing workpieces, wherein it is possible to use the system in an extremely flexible manner.

This object is achieved with a downdraft table with the workpiece holder for a workpiece to be held according to the features of claim 1.

According to the invention, the downdraft table has a workpiece holder for a workpiece to be held, wherein the workpiece holder is configured in a stationary manner, wherein a suction device is arranged beneath and/or next to the workpiece holder and can be used to discharge particles and/or gases downward in an exhaust flow, wherein the suction device is arranged around the workpiece holder with respect to the latter and is configured to be rotatable about the workpiece holder.

A workpiece holder can accordingly be fastened in the middle of the table and not to the edge of the table as before. By means of this measure, fumes and dust are collected a great deal better than would be the case with setting up next to the table edge.

The table surface formed by the suction device can be rotated 360°. The actual rotation of the table can be performed by the worker's hip in that the worker turns around the workpiece located on the table, and the table is "automatically" moved. Accordingly, the worker can assume the best work position required for processing without having to manually adjust the table, i.e., with his hands. Both hands remain free and can address the processing of the workpiece. This is in particular very advantageous when working with hand-guided machines that require both hands (such as angle grinders) since otherwise at least one hand must always leave the workpiece or machine in order to reposition the table.

In addition, an automated repositioning of the workpiece/workpiece holder synchronized with the rotational movement of the table can optionally be enabled in order to always achieve an ergonomically optimum work position.

Consequently, it is advantageously provided that the suction device is designed in the form of a hood and has at least one recess for a person working at the downdraft table on at least one side. On one side, the table has a recess in which the worker is located. Due to this recess, the worker can stand around the workpiece holder close to the object being processed despite the suction. This allows him to process the workpiece in an ergonomically favorable manner without becoming tired.

A particularly advantageous and therefore preferred embodiment of the invention provides that the suction device has at least one articulated sidewall on the top edge of the hood. Several sidewalls articulated next to each other on the top edge of the hood thereby form an upward extension of the edge of the hood in a vertical position. Optimum adjustment of the suction and chip capture is thus enabled.

The hinged sidewalls can also be used when processing larger workpieces. Unfolding to the very bottom is also possible.

Accordingly, it is advantageously provided that a plurality of sidewalls are articulated to the edge of the hood with the exception of the region of the recess.

Preferably, a fastening device to be connected to a person by a connecting element is arranged on the hood by means of which the suction device can be rotated around the workpiece holder by the movement of the person.

The suction device and/or the workpiece holder is/are advantageously designed to be adjustable in height. The height adjustment allows optimum ergonomic adaptation to the respective worker.

According to one embodiment of the invention, a platform can be arranged under the suction device and/or the workpiece holder on which a person can stand and can move around the workpiece holder.

Consequently according to another embodiment, it can be provided that an exhaust air line and/or a suction device is arranged in the platform that conveys the air around the workpiece holder through the suction device.

Another embodiment of the invention provides that the suction device has a suction arm which is adjustable relative to its position with respect to the workpiece holder with an exhaust airflow guided in the interior thereof.

Preferably, the suction device is covered at the top by means of a perforated plate, a grate or a grid, for example made of steel, fiber-reinforced plastic or wood.

Further advantageous embodiments are found in the additional dependent claims or their possible subcombinations.

Figure 2:
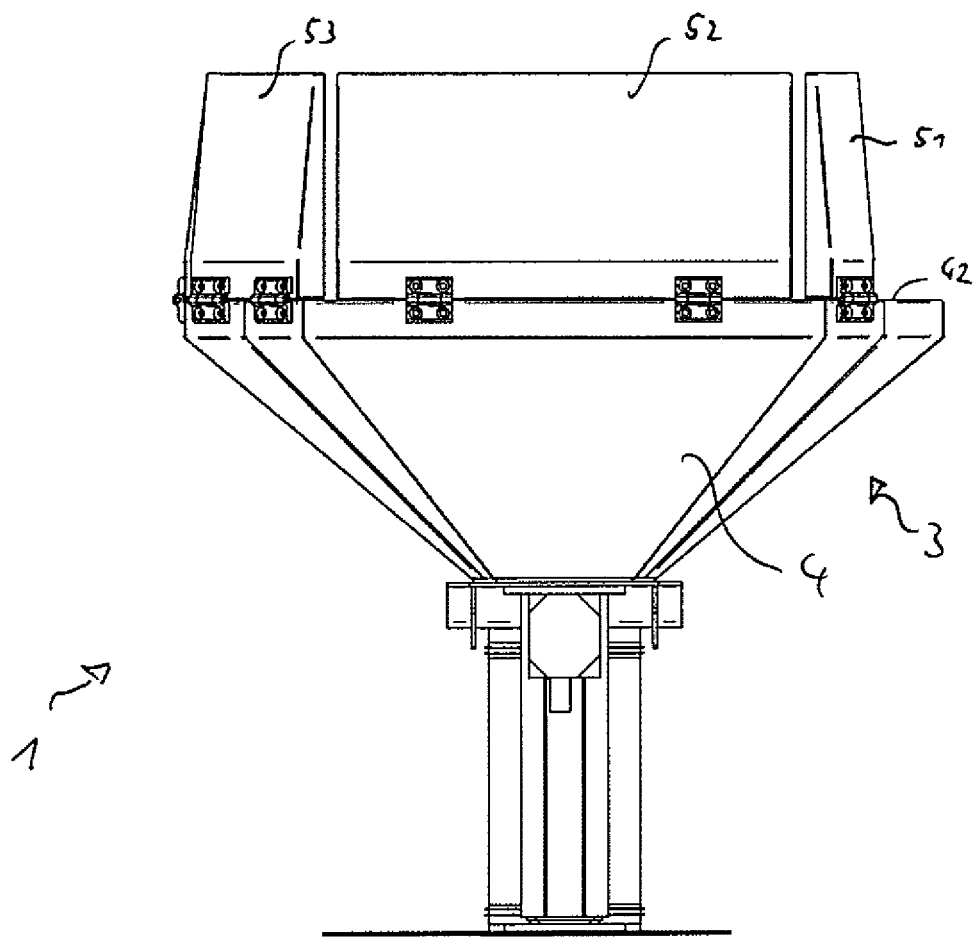
Figure 3:
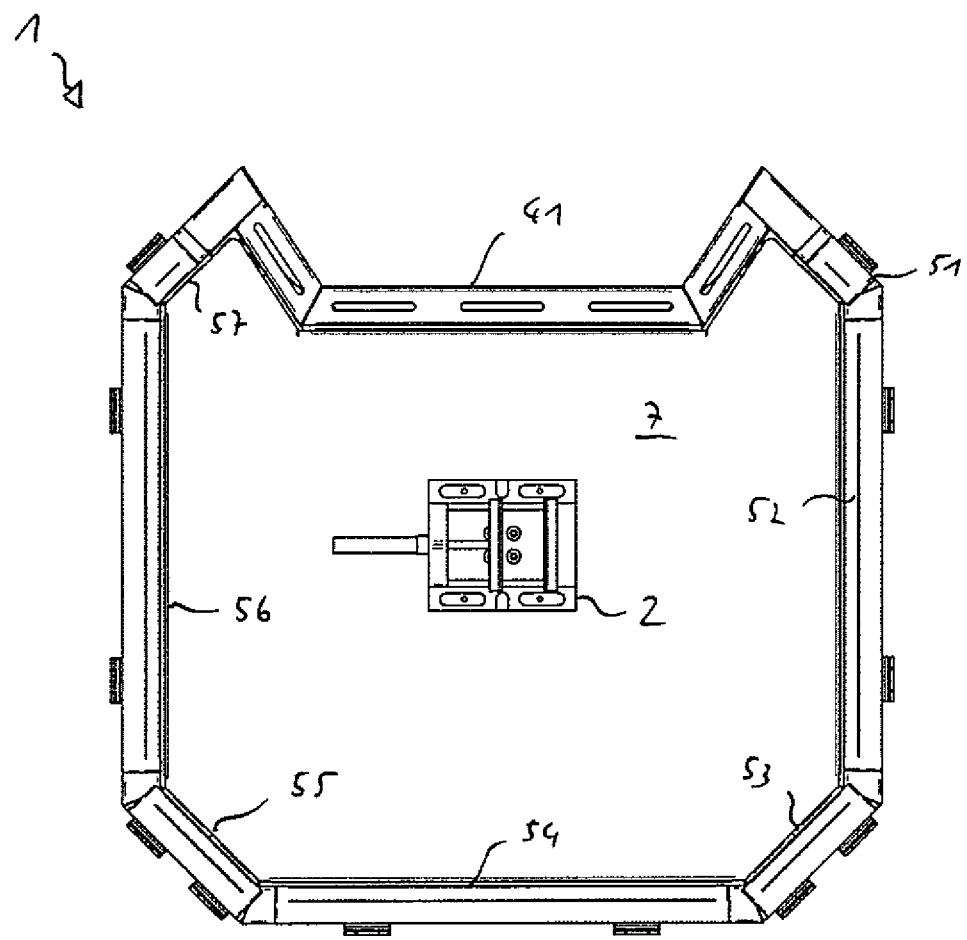
Figure 4:
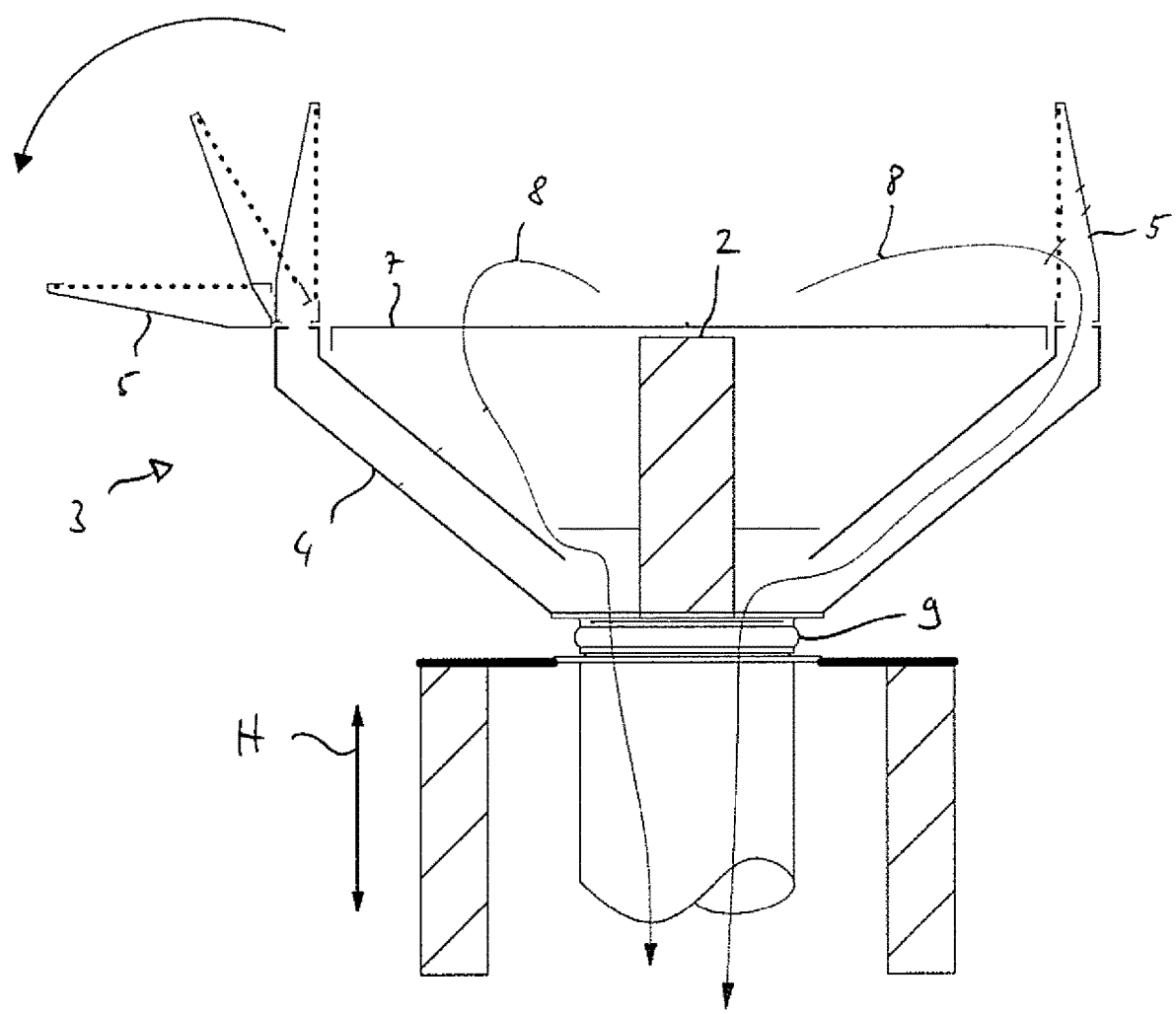
Figure 5:
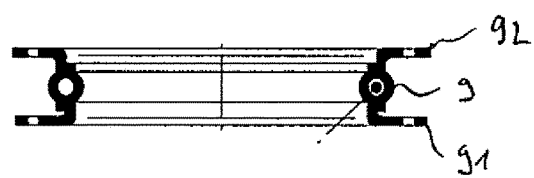
Figure 6:
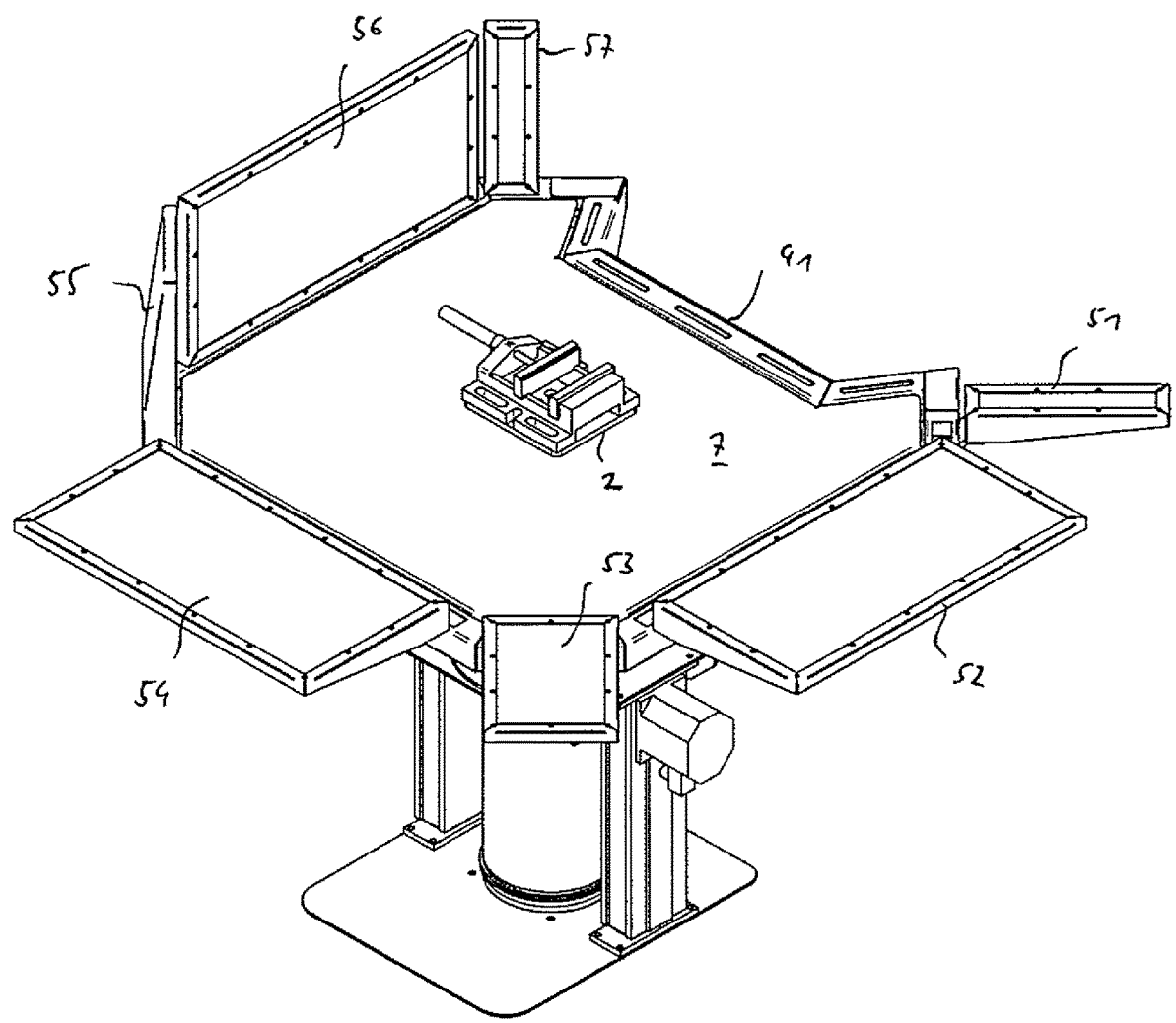
Figure 7:
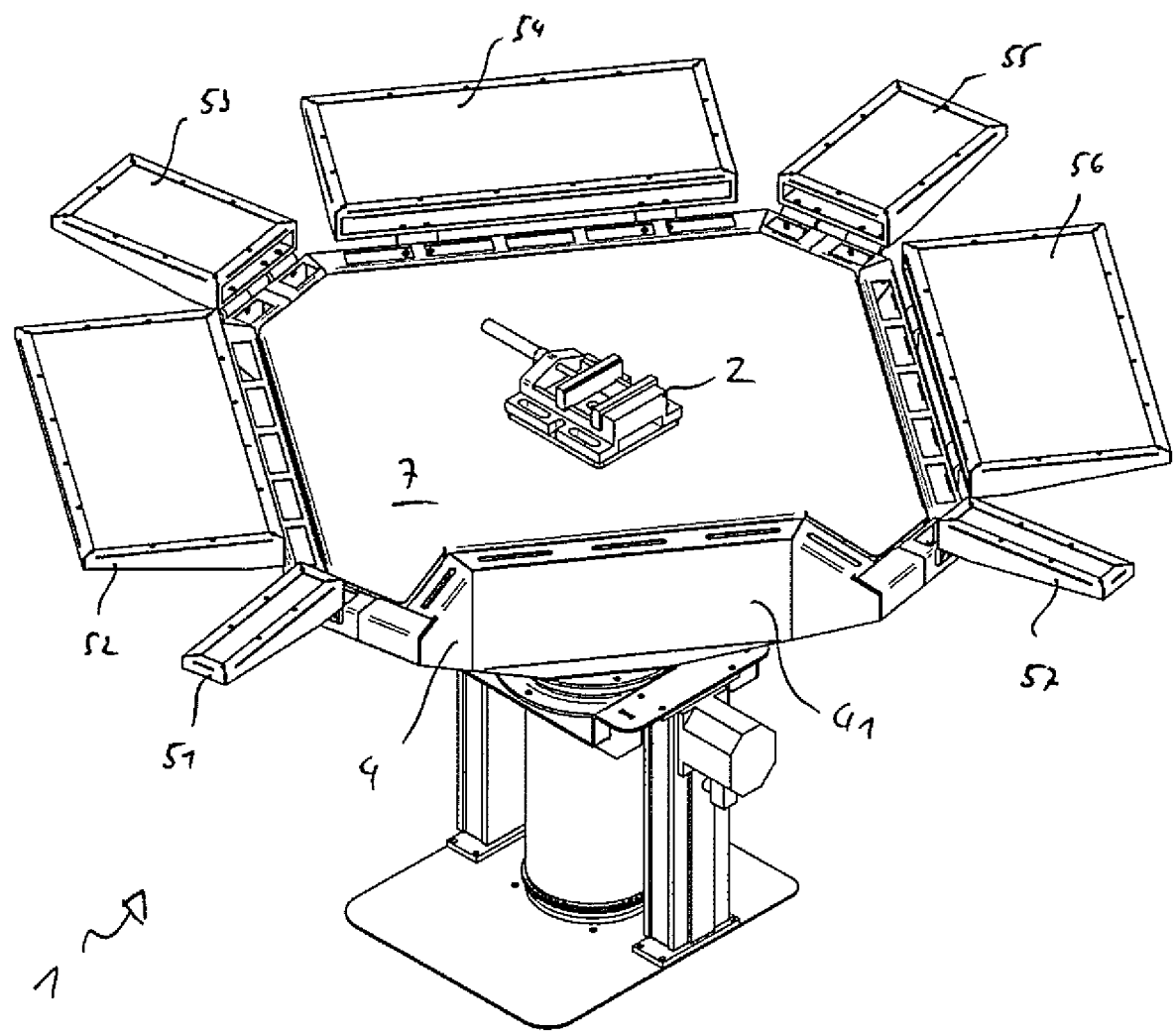
Figure 8:
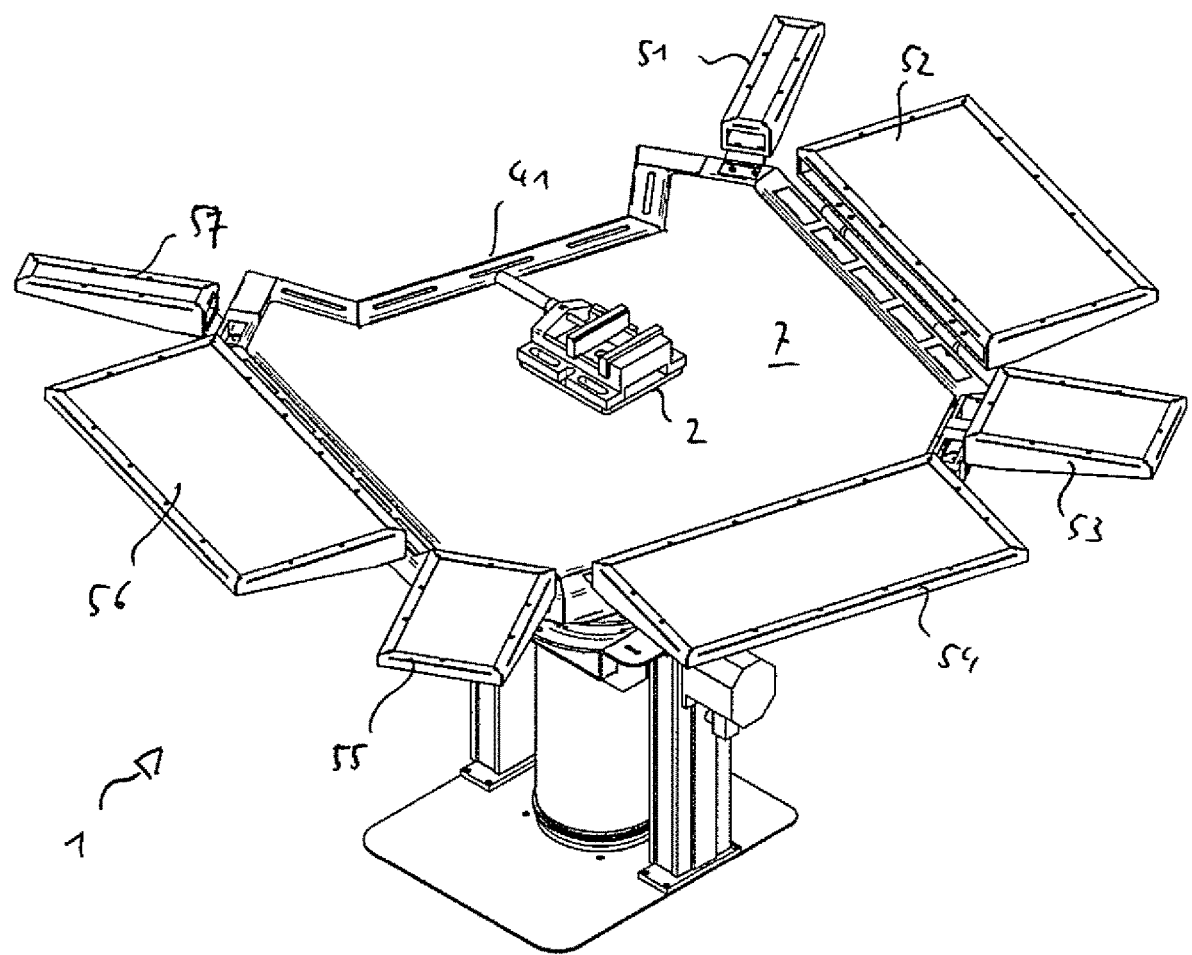
Figure 9:
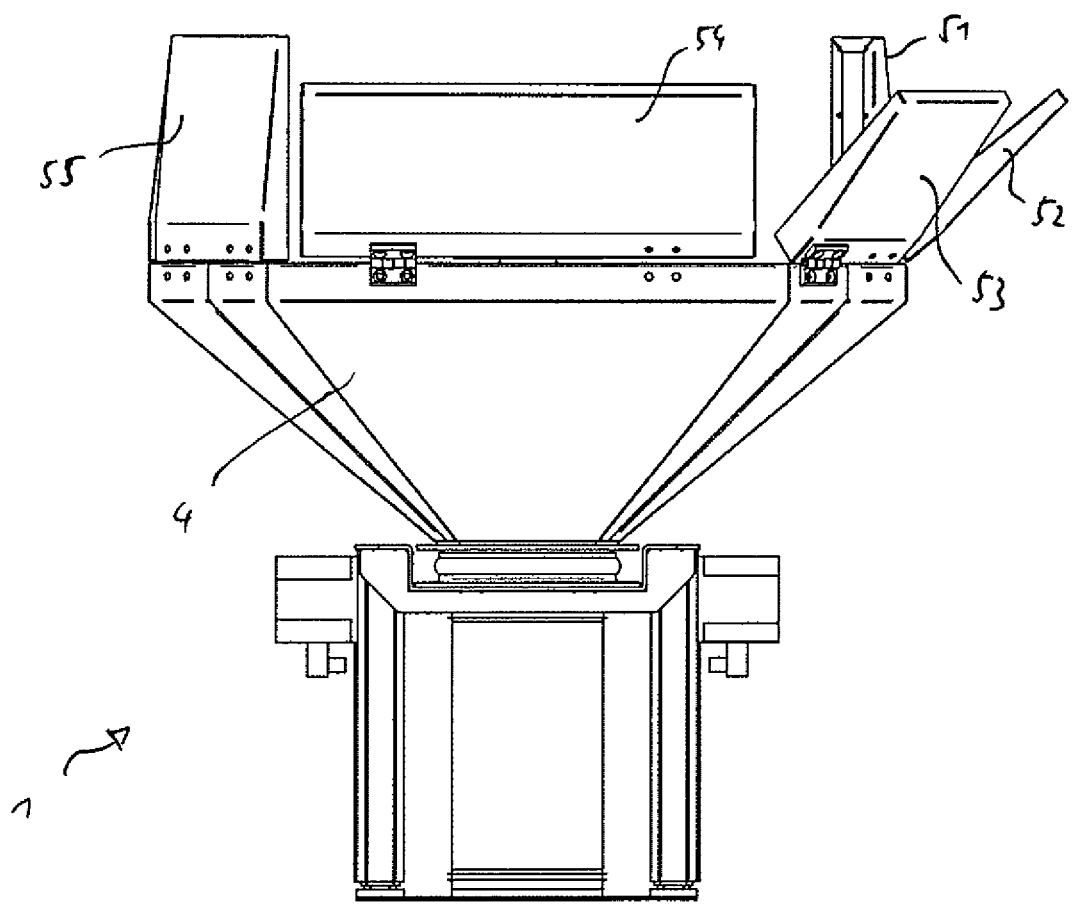
Figure 10:
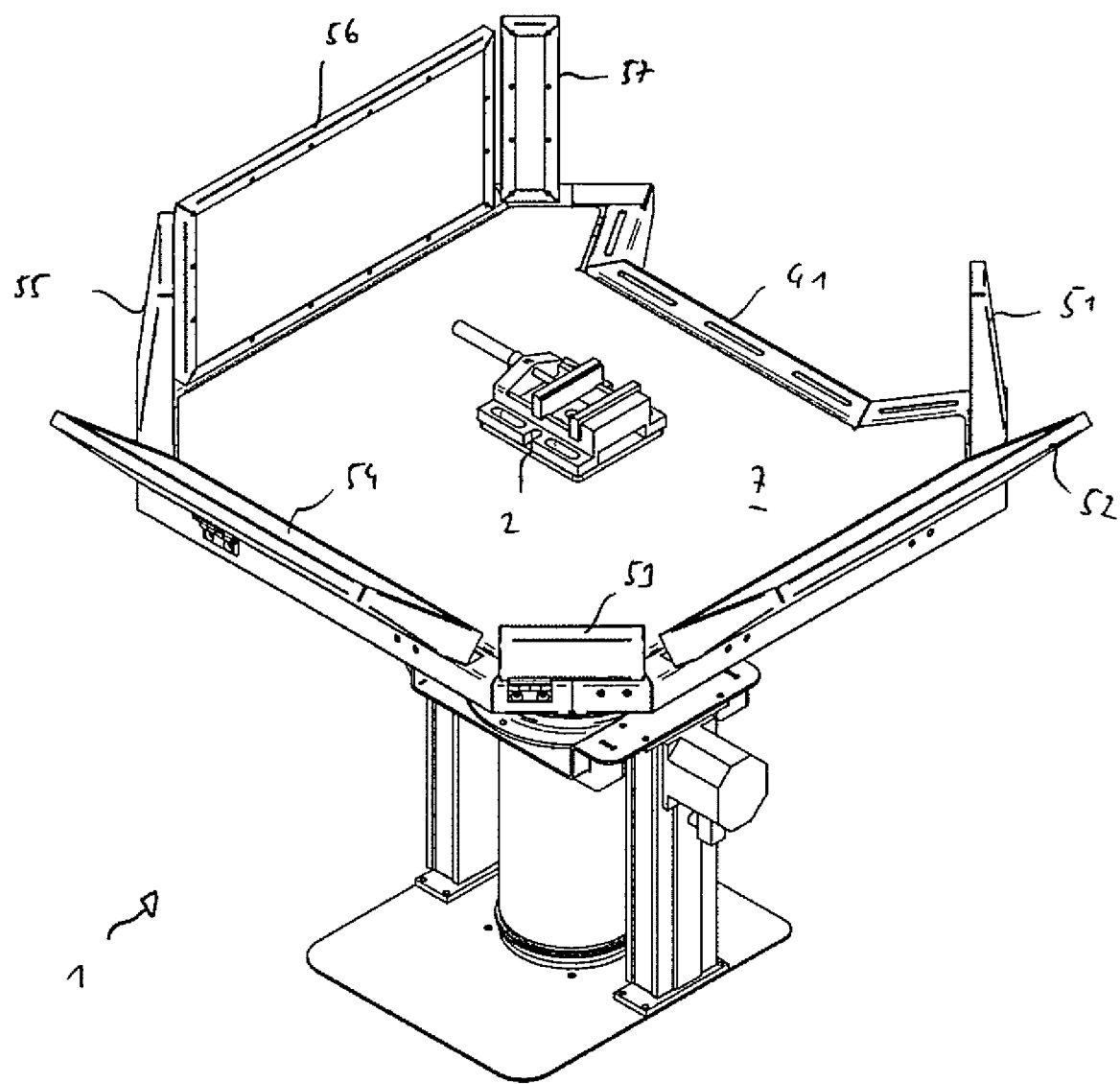
Figure 11:
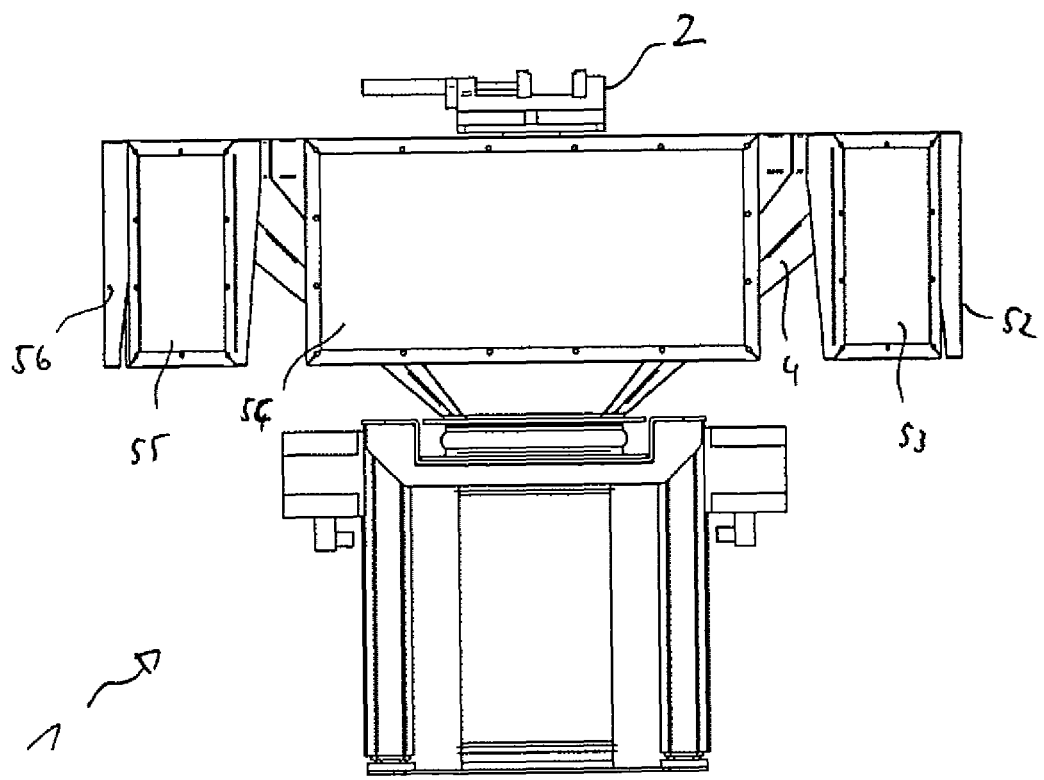
Figure 12:
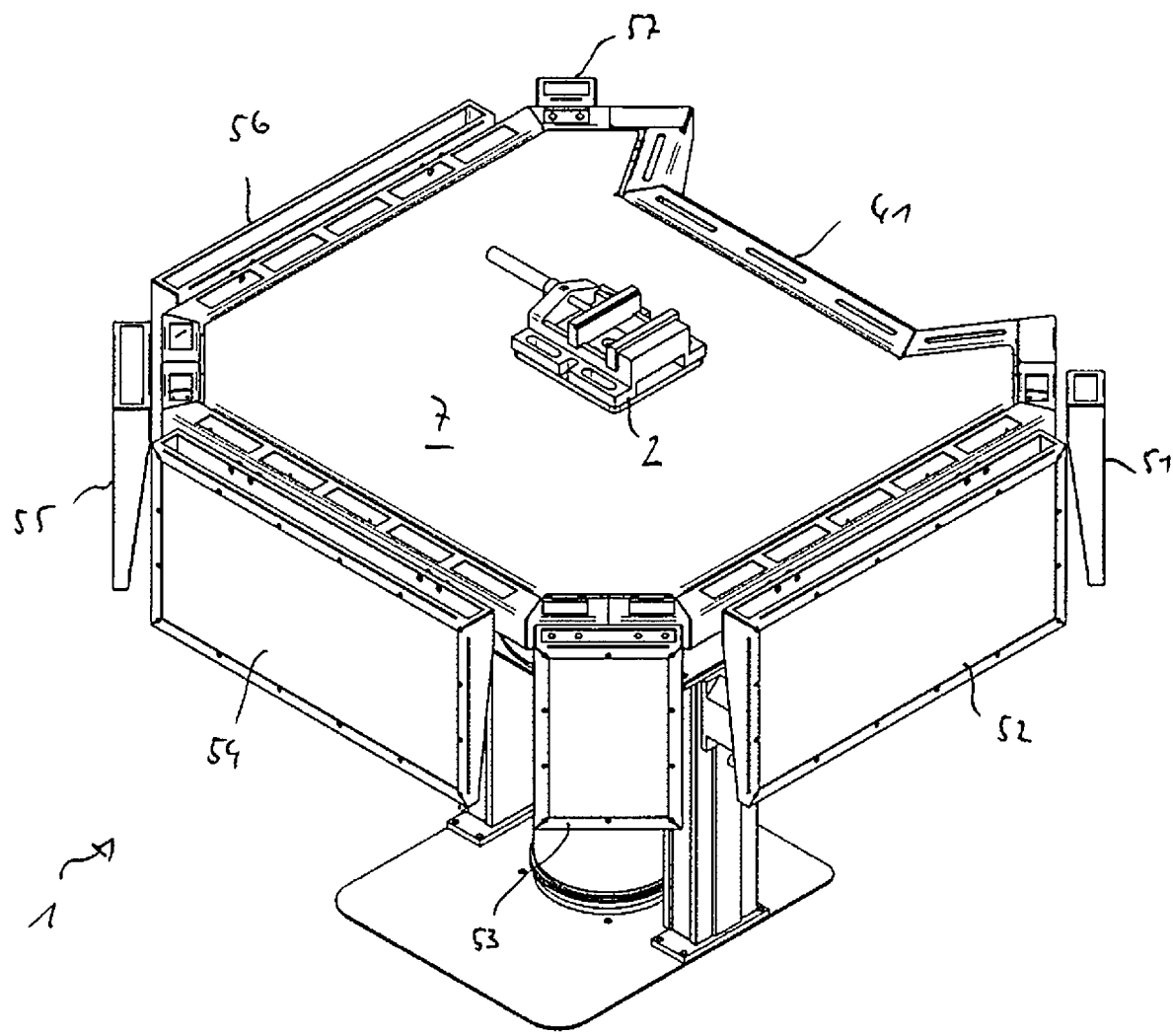
Figure 13:
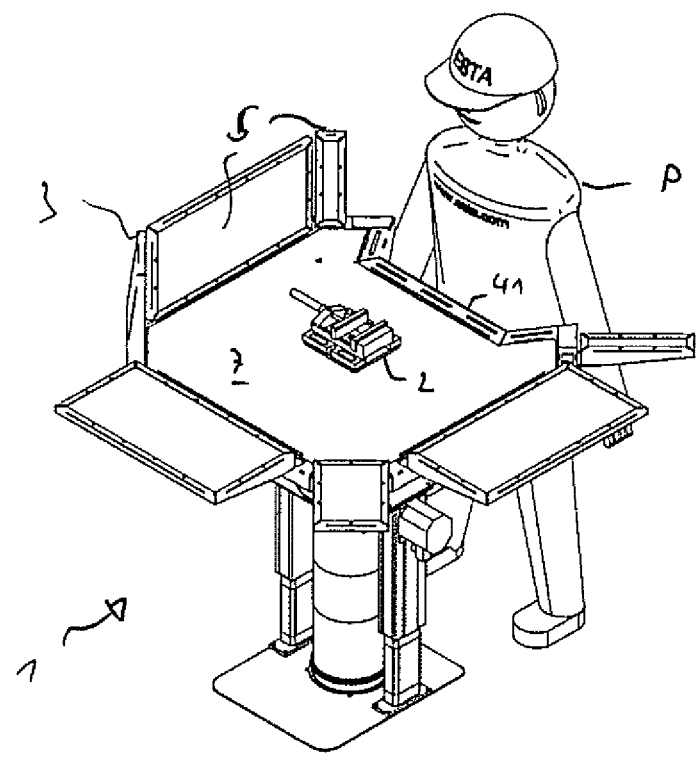
Figure 14:
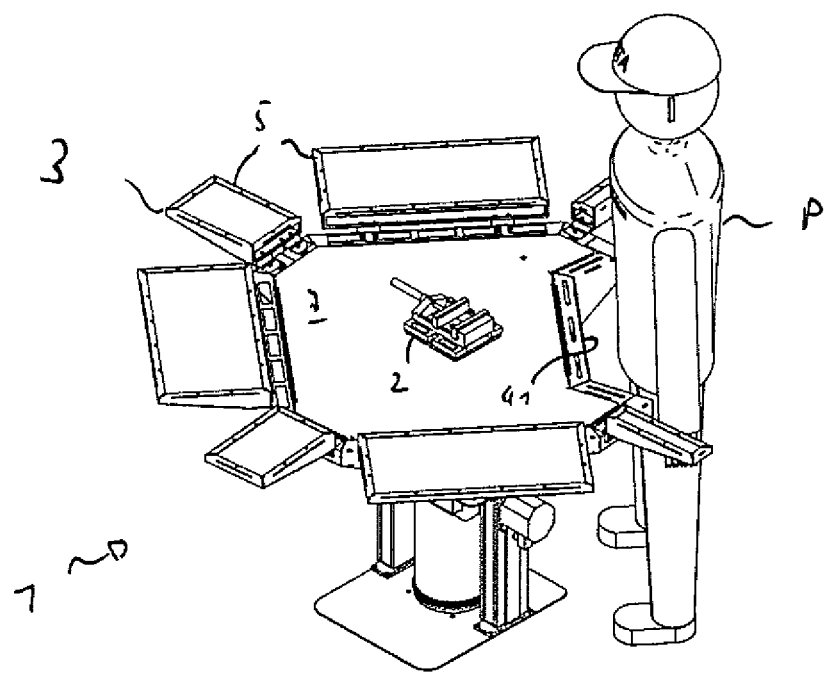
Figure 15:
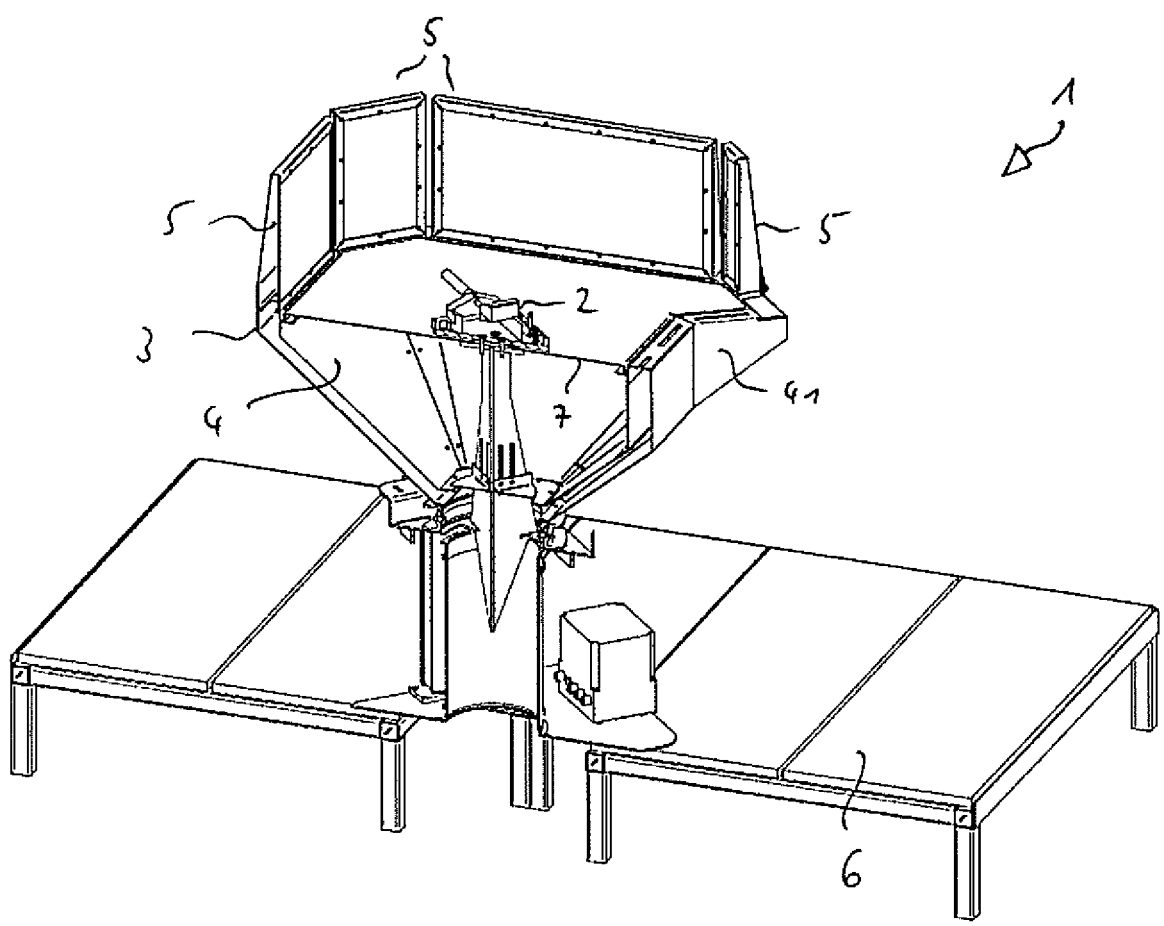

The invention will be explained in greater detail below with reference to the drawings. In particular, the schematic representation in:

FIG. 1 shows a schematic oblique view of a downdraft table according to the invention with a workpiece holder and a suction device that can rotate around it, FIG. 2 shows a schematic representation of the downdraft table from FIG. 1 viewed from the side, FIG. 3 shows a schematic representation of the downdraft table from FIG. 1 viewed from above, FIG. 4 shows a schematic cross-sectional view of a downdraft table according to the invention with a workpiece holder and a suction device that can rotate around it, wherein the guidance of air is apparent, FIG. 5 shows a detail of the rotatable connection between the rotatable top part and rigid bottom part of the downdraft table, FIG. 6 shows a schematic representation of the downdraft table from FIG. 1 with sidewalls that are partially set up horizontally, FIG. 7 shows a schematic representation of the downdraft table from FIG. 1 with sidewalls that are set up horizontally, FIG. 8 shows a schematic representation of the downdraft table from FIG. 7, wherein the suction device is rotated relative to the workpiece holder, FIG. 9 shows a schematic side view of a downdraft table with some sidewalls set at an angle to the horizontal, FIG. 10 shows the downdraft table from FIG. 9 viewed obliquely from above, FIG. 11 shows a schematic side view of a downdraft table with sidewalls folded entirely down, FIG. 12 shows the downdraft table from FIG. 11 viewed obliquely from above, FIG. 13 shows a schematic oblique view of a downdraft table according to the invention with a worker with a first position of the suction device, FIG. 14 shows a schematic oblique view of a downdraft table according to the invention with a worker with a second position of the suction device, and FIG. 15 shows a schematic oblique view of a downdraft table according to the invention with a platform.

The same reference numbers in the figures identify the same or equivalently acting elements.

FIG. 1 shows an example of a downdraft table 1 with a workpiece holder 2 for a workpiece to be held.

The workpiece holder 2 is designed stationary; below and next to the workpiece holder 2, a suction device 3 is arranged by means of which particles and/or gases can be removed downward in an exhaust flow.

In this case, the suction device 3 is arranged around the workpiece holder 2 with respect thereto and is configured to be rotatable about the workpiece holder 2.

The suction device 3 is configured in the form of a hood 4 (see FIG. 2) and has a recess 41 for a person P on one side working at the downdraft table 1.

The suction device 3 has a plurality of sidewalls 5, 51 to 57 articulated to the top edge 42 of the hood 4.

The sidewalls are not articulated in the region of the recess 41 in order to allow free access by a worker.

The suction device 3 is covered at the top by means of a perforated plate 7. At this location, a grid or grate of appropriate materials can also be conceivable.

FIGS. 2 and 3 show the downdraft table 1 from additional views.

FIG. 4 shows a schematic cross-sectional representation of the downdraft table 1. The exhaust guide 8 can be seen. The air is drawn downward through the hood 4 from the workpiece holder 2 or the seat thereof. The hinged sidewalls 5 serve to guide air and capture chips. The device is adjustable in height (arrow H).

The top part is rotated by a rotating element 9 arranged between a seat 91 and a turntable 92. For more information, see also FIG. 5.

FIGS. 6 to 12 show the downdraft table 1 with different settings of the sidewalls 5, 51 to 57. A great many different adaptations are possible corresponding to the workpiece to be clamped and/or the processing to be carried out.

FIGS. 13 and 14 show an example of how the suction device 3 of the downdraft table 1 can be rotated around the stationary workpiece holder 2 by the person P standing in the recess 41.

FIG. 15 shows a platform 6 on which the suction device 3 and the workpiece holder 2 are mounted, wherein the area around the platform can be used for running lines and pipes.

LIST OF REFERENCE NUMBERS

1 Downdraft table
2 Workpiece holder
3 Downdraft device
4 Hood
41 Recess
42 Top edge
5 Side wall
51 Side wall
52 Side wall
53 Side wall
54 Side wall
55 Side wall
56 Side wall
57 Side wall
6 Platform
7 Perforated plate
8 Exhaust air
9 Rotating element
91 Seat
92 Turntable
H Height adjustment
P Person

The invention claimed is:

1. A downdraft table with a workpiece holder for a workpiece to be held,
wherein the workpiece holder is designed stationary, wherein below and/or next to the workpiece holder, a suction device is arranged by means of which particles and/or gases can be removed downward in an exhaust flow,
wherein
the suction device is arranged around the workpiece holder with respect thereto and is configured to be rotatable about the workpiece holder.

2. The downdraft table according to claim 1,
wherein
the suction device is configured in the form of a hood and has at least one recess for a person on at least one side working at the downdraft table.

3. The downdraft table according to claim 2,
wherein
the suction device has at least one sidewall articulated to the top edge of the hood.

4. The downdraft table according to claim 3,
wherein
a plurality of sidewalls are articulated to the edge of the hood with the exception of the region of the recess.

5. The downdraft table according to claim 1,
wherein
a fastening device to be connected to a person by a connecting element is arranged on the hood by means of which the suction device can be rotated around the workpiece holder by the movement of the person.

6. The downdraft table according to claim 1,
the suction device and/or the workpiece holder is/are designed to be adjustable in height.

7. The downdraft table according to claim 1,
wherein
a platform is arranged under the suction device and/or the workpiece holder on which a person can stand and can move around the workpiece holder.

8. The downdraft table according to claim 7,
wherein
an exhaust air line and/or a suction device is arranged in the platform that conveys the air around the workpiece holder through the suction device.

9. The downdraft table according to claim 1,
wherein
the suction device has a suction arm which is adjustable relative to its position with respect to the workpiece holder with an exhaust air flow guided in the interior thereof.

10. The downdraft table according to claim 1, wherein
the suction device is covered at the top by means of a perforated plate, a grate or a grid.

* * * * *